(No Model.)
J. S. HULL & T. A. HAND.
PROCESSING APPARATUS.
No. 401,276. Patented Apr. 9, 1889.
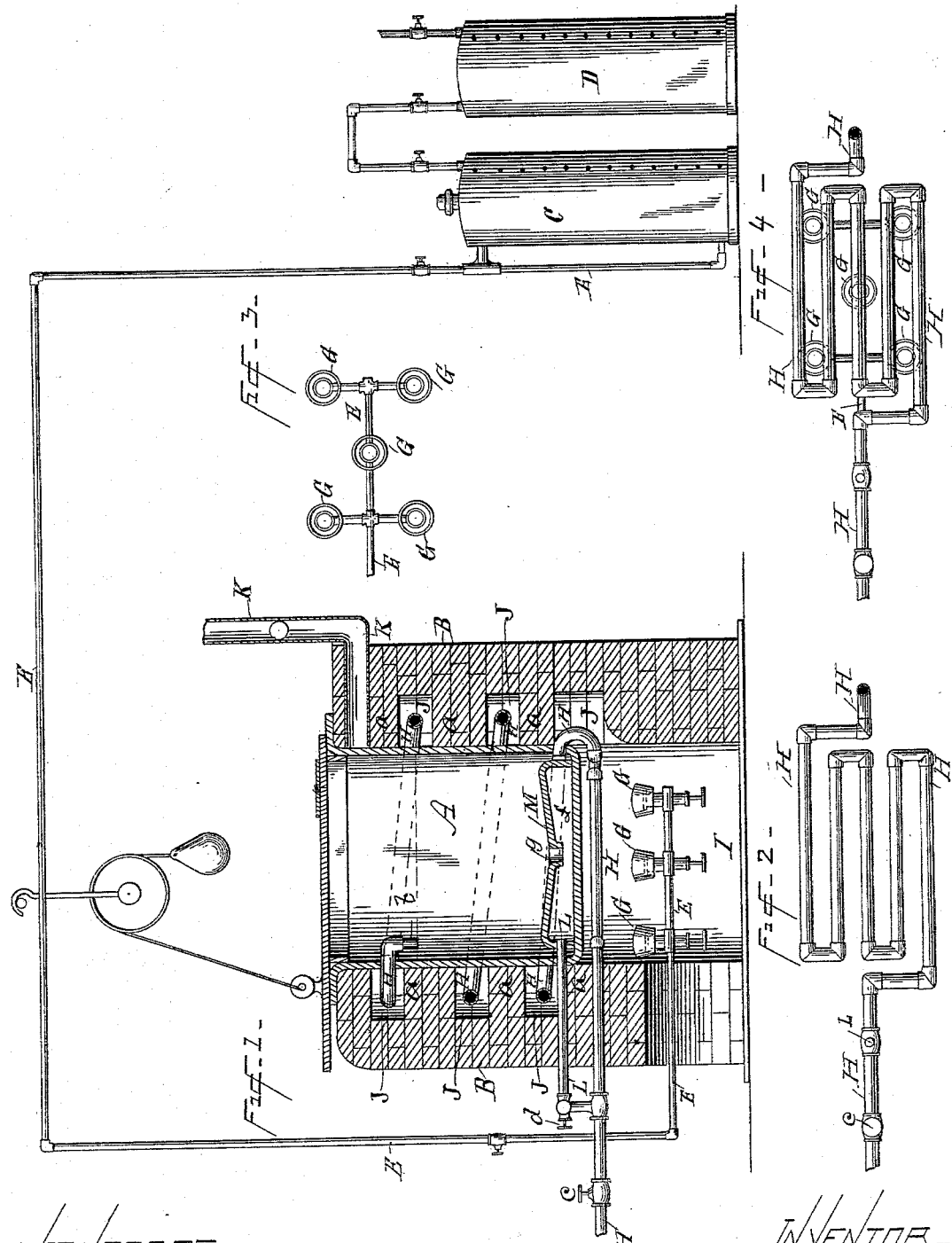
WITNESSES
Maude M. Howlett.
J. Mawdsley.
INVENTOR
John S. Hull,
Thomas A. Hand,
By their attorney,
J. S. Brown

UNITED STATES PATENT OFFICE.

JOHN S. HULL AND THOMAS A. HAND, OF BALTIMORE, MARYLAND.

PROCESSING APPARATUS.

SPECIFICATION forming part of Letters Patent No. 401,276, dated April 9, 1889.

Application filed November 27, 1888. Serial No. 292,041. (No model.)

*To all whom it may concern:*

Be it known that we, JOHN S. HULL and THOMAS A. HAND, citizens of the United States, residing in Baltimore, Maryland, have invented an Improved Processing Apparatus; and we do hereby declare that the following is a full and exact description of the same, reference being had to the accompanying drawings, making part of this specification.

Our invention primarily relates to kettles or water-heating reservoirs to be used in "processing" or heating and sealing cans containing fruits or other provisions; but the improvements are applicable to kettles or water-heating reservoirs for other uses. In this apparatus we heat the water in the kettle or reservoir with one or more burners, which burn gas or hydrocarbon-oil vapors.

The improvements will be hereinafter specified and defined in the claims.

In the accompanying drawings, Figure 1 represents a central vertical section of our improved processing apparatus and a side view of an oil-tank, compressed-air reservoir, and intermediate conducting-pipes connected therewith; Fig. 2, a top view of the reduplicated water-feeding pipe under the processing-kettle; Fig. 3, a top view of a series of hydrocarbon vapor or gas burners used under the processing-kettle and reduplicated water-supply pipe; Fig. 4, a top view of both the reduplicated water-supply pipe and the series of burners in their proper relative positions.

Like letters designate corresponding parts in all of the figures.

In the drawings, A represents the kettle or water-heating reservoir, of any desired form; B, the brick-work or casing in which the kettle is set; C, a hydrocarbon-oil reservoir; D, a compressed-air reservoir connected with the oil-reservoir; E, a pipe leading from the oil-reservoir to the burners; G G, a set of burners; H, a water-supply pipe leading to the kettle from any source of water-supply, and I a burner-chamber under the kettle or water-heating reservoir.

First we form a spiral flue, J, leading from the burner-chamber I around and around the kettle to the upper part or near the top of the same, from the upper end of which flue a pipe, K, leads and carries off the products of combustion after they have traversed the whole length of the spiral flue in contact with the kettle and have imparted the greater part of their heat to the said kettle. The intervening partition $a$ of the brick-work or casing between the turns of the flue is close and tight and does not allow the products of combustion to take a shorter course than through the spiral flue. Then the water-supply pipe H, after extending through the burner-chamber I, extends upward in the spiral flue J, preferably nearly in a central position in the same, coiling also around the kettle in its course, and finally enters to the interior of the kettle near the top of the same and terminates in a discharge nozzle or end, $b$. By this arrangement of the water-supply pipe the water flowing into the kettle through the same becomes heated to a boiling temperature, or nearly so, and does not cool the boiling water in the kettle. In this way the heat escaping through the flue is utilized in a twofold way: first, by assisting to heat or maintain the heat of the water in the kettle, and, second, by heating the supply-water up to the desired temperature before it is discharged into the kettle.

Again, in order to further assist in heating the supply-water to the requisite degree of temperature the supply-pipe is reduplicated in the burner-chamber under the kettle, so as to expose it longer and more of its surface to the heat of the burners in its passage. This reduplication of the water-supply pipe is conveniently made in the form shown in Fig. 2, with short pieces of pipes and pipe-couplings, though we do not confine ourselves to any particular form or manner of construction, as it may be of circular, spiral, or any other convenient and known form. Next we arrange a set of burners, G G, in a group—say as in Fig. 3—under different parts of the kettle and under the reduplications of the water-supply pipe in any suitable manner to distribute the heat effectually under the kettle; and we also arrange them in connection with the reduplications of the supply-pipe, so as to act the most effectually on the same, as shown in Fig. 4, or otherwise in an equivalent way. We show five burners in the drawings;

but there may be more or fewer, according to the size of the kettle or power of each burner. The burners are thus arranged in groups, so that the entire number, or nearly so, may be employed in first heating the water in the kettle, so as to effect the same rapidly; and after the water has reached the boiling-point in the kettle the temperature of the same may be retained at the boiling-point by a single burner, as the central one in the group, or two or three of them at most, the others being extinguished. In this way we heat up the water and maintain its heat in the most efficient way and with great economy of gas or oil used. Finally, in order to keep up a most effective heating circulation of the water in the kettle, we provide for drawing out a portion of the water in the same continually and passing it up again through the heating portion of the supply-pipe. This we do substantially by the following means: We connect the interior of the kettle, near the bottom, with the supply-pipe by a short pipe, L, Fig. 1, and when it is desired to produce this heating circulation a valve, c, in the supply-pipe outside of its connection with this short pipe is turned to cut off further cold-water supply, and another valve, d, in the short pipe is turned to open its passage, and then the circulation goes on in accordance with the well-known law of water circulation in pipes—downward where it is less heated and upward where it is most heated.

In order further to enhance the efficiency of this circulating device for reheating the water and to relieve the same from interference from the cans or other articles in the kettle, we insert a "false" bottom, M, in the kettle a little above the main bottom thereof and above the outlet of the short pipe L, thereby inclosing a hollow chamber, f, below the same, and make one or more holes, g, through the said false bottom to allow a free circulation of the water down through the same.

We claim as our invention—

1. A vertical furnace having a spiral flue formed in the masonry, in combination with a vessel for containing water suspended in the furnace and surrounded by said flue, a heating-chamber below the vessel, and a supply-pipe passing through the heating-chamber, encircling the vessel in the path of the flue, and communicating with the upper part thereof, substantially as described.

2. A vertical furnace having a spiral flue formed in the masonry, in combination with a vessel containing water suspended in the furnace and surrounded by said flue, a heating-chamber below the vessel, and a supply and circulating pipe communicating with the vessel at the lower end thereof, passing through the heating-chamber, encircling the vessel in the path of the flue, and again communicating with the vessel near the upper end thereof, substantially as described.

3. In combination with a kettle or water-heating reservoir, a heating-chamber under the same, a water-supply pipe leading into the heating-chamber and opening into the upper part of the said kettle or reservoir, one or more burners under the said pipe and kettle or reservoir, and a pipe leading from the bottom of the kettle or reservoir to the water-supply pipe, substantially as and for the purpose herein set forth.

4. In combination with a kettle or water-heating reservoir, a heating-chamber under the same, a water-supply pipe leading into the heating-chamber and opening into the upper part of the said kettle or reservoir, one or more burners under the said pipe and kettle or reservoir, a false bottom in the kettle or reservoir, and a pipe leading from the interior of the kettle or reservoir under the false bottom out and into the said water-supply pipe, substantially as and for the purpose herein set forth.

In witness whereof we have hereunto signed our names in the presence of two subscribing witnesses.

JOHN S. HULL.
THOMAS A. HAND.

Witnesses:
J. S. BROWN,
EMMA M. GILLETT.